United States Patent Office 3,097,981
Patented July 16, 1963

3,097,981
PROPELLANT COMPOSITIONS
James E. Pritchard, Bartlesville, Okla., and Jo L. Reger, McGregor, Tex., assignors to Phillips Petroleum Company, a corporation of Delaware
No Drawing. Filed Feb. 24, 1955, Ser. No. 490,431
12 Claims. (Cl. 149—19)

This invention relates to solid propellant compositions. In a further aspect this invention relates to solid rocket propellants which are particularly useful in jet propulsion motors, also known as rocket motors. In a more specific aspect this invention relates to solid rocket propellants comprising an oxidant and a salt of an acid and a polymer containing tertiary nitrogen in a heterocyclic ring.

Propellants of this type have achieved considerable military as well as commercial importance. Jet propulsion motors of the type in which the solid rocket propellants of this invention can be employed, can be used to assist in the take-off of a heavily loaded plane. These propellants can also be used in other situations as an auxiliary to conventional power plants where an extra surge of power is required. These propellants can also be employed as the sole propellant in some situations.

The following are objects of this invention:
An object of this invention is to provide new solid propellant compositions. A more specific object of this invention is to provide rocket propellants comprising an oxidant and an acid salt of a polymer containing a tertiary heterocyclic nitrogen atom.

Other objects of this invention will become apparent upon reading the accompanying disclosure.

We have found that the use of polymeric salts of polymerizable heterocyclic nitrogen bases of the pyridine and quinoline series are useful as binders for solid propellants, the use of such binders providing a substantial improvement in processability of the mix as well as improvements in flexibility, resilience, and general rubbery properties of the cured propellants. The exact reason for this improvement in properties is not completely understood, but it is believed to be, at least in part, due to the fact that these salts possess surface activity. The propellants produced using the binder of our invention are more resistant to shock than those in which no acid is employed. In addition, the propellants have good burning rate, tensile, compression, and beam flexure characteristics.

The following examples set forth specific compositions which have been made by us embodying the teaching of this invention.

*Example I*

The following recipe was employed for the copolymerization of butadiene with 2-methyl-5-vinylpyridine in aqueous emulsion at 41° F.

|  | Parts by weight |
|---|---|
| Water | 180 |
| Butadiene | 90 |
| 2-methyl-5-vinylpyridine | 10 |
| Potassium fatty acid soap [1] | 5 |
| KCl | 0.2 |
| Daxad 11 [2] | 0.1 |
| $K_4P_2O_7$ | 0.165 |
| $FeSO_4 \cdot 7H_2O$ | 0.139 |
| Cumene hydroperoxide | 0.10 |
| Mercaptan blend [3] | 0.57 |
| Shortstop: Goodrite 3955 [4] | 0.15 |

[1] Potassium office synthetic rubber soap.
[2] Sodium salt of condensed alkyl aryl sulfonic acid.
[3] A blend of tertiary $C_{12}$, $C_{14}$ and $C_{16}$ aliphatic mercaptans in a ratio of 3:1:1 parts by weight.
[4] A 50/50 mixture of sodium dimethyldithiocarbamate and sulfur in the form of sodium polysulfide.

An antioxidant, phenyl-beta-naphthylamine, was added in an amount of 1.5 percent by weight based upon the polymer.

Latices of two runs were combined to give a product having a Mooney value (ML–4) of 20. The resulting latex was then masterbatched with a carbon black slurry made with 900 parts by weight of water, 100 parts by weight of loose carbon black (Philblack A), 2 parts by weight of Marasperse CB (sodium lignin sulfonate), and 0.27 part by weight of sodium hydroxide. The masterbatch contained 20 parts by weight of carbon black per 100 parts of the butadiene/2-methyl-5-vinylpyridine copolymer. The procedure consisted of the addition of the black slurry to the latex in the coagulation tank, followed by the addition of a small amount of brine. Coagulation was induced by addition of acid in sufficient amount to give a serum pH of 6.0 to 7.0. The resulting black masterbatch was given five caustic washes at a temperature of 150° F. and a pH of 10, followed by four water washes at a temperature of 150° F.

A simulated propellant composition was prepared using the following formulation:

|  | Parts by weight |
|---|---|
| Masterbatch of 90/10 butariene/2-methyl-5-vinylpyridine copolymer and carbon blark (Philblack A) | 120 |
| Epichlorohydrin | 6 |
| Sulfur | 1.75 |
| Zinc oxide | 3 |
| Milori blue [1] | 15 |
| Flexamine [2] | 3 |
| Aerosol OT [3] | 1 |
| Butyl zimate [4] | 1 |
| Benzophenone | 8 |
| Pentaryl A [5] | 8 |
| Ammonium chloride | 557 |

[1] A pigment similar to Prussian blue but having a red tint, prepared by the oxidation of a paste of potassium ferrocyanide and ferrous sulfate.
[2] Physical mixture containing 65 percent of a complex diarylamineketone reaction product and 35 percent of N,N'-diphenyl-p-phenylenediamine.
[3] Dioctyl ester of sodium sulfosuccinic acid.
[4] Zinc dibutyldithiocarbamate.
[5] Amylbiphenyl.

The various ingredients were added to the butadiene/2-methyl-5-vinylpyridine copolymer masterbatch in the order in which they are listed. To portions of the composition were added varying amounts of 70 percent nitric acid, 100 percent nitric acid (white fuming nitric acid), 95 to 98 percent sulfuric acid, and glacial acetic acid. The acids were added dropwise to the compositions and mixing continued to effect incorporation. Upon addition of the acid, the material began to band together and the ammonium chloride appeared to be more rapidly and completely incorporated than in the portion containing no acid. The test specimens were cured 15 hours at 175° F. and Shore hardness values determined. The difference between the 0 and 10 second readings of Shore hardness is a measure of the plasticity of the material, the greater the difference the greater the plasticity. The following results were obtained:

| Acid | | Shore hardness, $A_2$ | |
|---|---|---|---|
| Type | PHR[1] | 0 | 10 sec. |
| Nitric, 70% | 1 | 78 | 70–72 |
| Do | 2 | 76 | 61 |
| Do | 3 | 72 | 60 |
| Do | 5 | 68 | 54–56 |
| Nitric, 100% | 2 | 78 | 64 |
| Sulfuric, 95–98% | 2 | 52 | 38–42 |
| Acetic, glacial | 2 | 70 | 56–60 |
|  | 2 | 68 | 48–51 |

[1] Parts per 100 parts rubber.

A portion of each composition was cooled to −70° F. with Dry Ice. Resistance to fracture was tested by hitting each sample with a mallet. The composition which did not contain acid gave a glassy fracture when struck one blow and the sound was similar to that observed when hitting steel. The other samples were resilient and somewhat rubbery and could be fractured only after repeated blows of the mallet. When hit with a mallet, the sound produced was similar to that observed when hitting rubber.

*Example II*

Butadiene/2-methyl-5-vinylpyridine copolymers were prepared by aqueous emulsion polymerization at 41° F. in accordance with the following recipe:

| Run | 1 | 2 | 3 | 4 | 5 | 6 | 7 |
|---|---|---|---|---|---|---|---|
| Water, parts by weight | 180 | 180 | 180 | 180 | 180 | 180 | 180 |
| Butadiene, parts by weight | 90 | 90 | 90 | 90 | 90 | 90 | 90 |
| 2-methyl-5-vinyl-pyridine, parts by weight | 10 | 10 | 10 | 10 | 10 | 10 | 10 |
| Potassium fatty acid soap,[1] parts by weight | 5 | 5 | 5 | 5 | | | |
| Potassium oleate, parts by weight | | | | | 5 | 5 | 5 |
| Daxad 11,[2] parts by weight | 0.1 | 0.1 | 0.1 | 0.1 | 0.1 | 0.1 | 0.1 |
| KCl, parts by weight | 0.1 | 0.1 | 0.1 | 0.1 | 0.1 | 0.1 | 0.1 |
| $K_4P_2O_7$, parts by weight | 0.165 | 0.165 | 0.165 | 0.132 | 0.132 | 0.132 | 0.132 |
| $FeSO_4 \cdot 7H_2O$, parts by weight | 0.139 | 0.139 | 0.139 | 0.106 | 0.106 | 0.106 | 0.106 |
| Diisopropyl benzene hydroperoxide, parts by weight | 0.107 | | | | | | |
| Cumene hydroperoxide, parts by weight | | 0.084 | 0.084 | 0.067 | 0.067 | 0.067 | 0.067 |
| Mercaptan blend, parts by weight | [4] 0.58 | [4] 0.60 | [4] 0.63 | [5] 0.50 | [5] 0.60 | | |
| $t$-$C_{12}$ mercaptan, parts by weight | | | | | | [6] 0.70 | 0.70 |
| Shortstop: Goodrite 3955 [3] | 0.15 | 0.15 | 0.15 | 0.15 | 0.15 | 0.15 | 0.15 |
| Antioxidant (percent based on polymer): phenyl-beta-naphthylamine | 2.0 | 2.0 | 2.0 | 2.0 | 2.0 | 2.0 | 2.0 |
| Time, hrs | 6.2 | 8.0 | 9.8 | 14.1 | 21 | 19.5 | 16.8 |
| Conversion, percent | 64 | 60 | 60 | 57 | 57 | 60 | 60 |
| Stripped Mooney (ML-4) | 53 | 31 | 35 | 33 | 12 | 10 | 12 |

[1] Potassium office synthetic rubber soap.
[2] Sodium salt of condensed alkyl aryl sulfonic acid.
[3] A 50/50 mixture of sodium dimethyldithiocarbamate and sulfur in the form of sodium polysulfide.
[4] A blend of tertiary $C_{12}$, $C_{14}$ and $C_{16}$ aliphatic mercaptans in a ratio of 3:1:1 parts by weight.
[5] A blend of tertiary $C_8$ and tertiary $C_{12}$ alphatic mercaptans in a 50/50 weight ratio.
[6] At 43 percent conversion 0.1 part mercaptan was charged.

Latices from the several runs were blended to give a polymer having a Mooney value (ML-4) of 20.

A carbon black (Philblack A) slurry was prepared using the following recipe:

| | Parts by weight |
|---|---|
| Water | 1260 |
| Philblack A | 100 |
| Marasperse CB | 2.8 |
| KOH | 0.38 |

The final slurry had a pH of 9, viscosity of 4 centipoises, and solids content of 7.2 percent.

The latex was masterbatched with the carbon black slurry, brine was added to effect creaming, and coagulation was accomplished at a pH of 6.0–6.5 by addition of acid. The carbon black slurry was used in an amount to give 10 parts by weight of carbon black per 100 parts by weight of the butadiene/2-methyl-5-vinylpyridine copolymer. The crumb was caustic washed once before leaving the coagulation unit. It was then washed five times with caustic at a pH of 10.5–11.0, 45 minutes being employed for each treatment. The temperature was 160° F. This treatment was followed by two water washes of 15 minutes each.

A binder composition for solid propellants was prepared in accordance with the following formulations:

| | Parts by weight |
|---|---|
| Masterbatch of 90/10 butadiene/2-methyl-5-vinylpyridine copolymer and carbon black (Philblack A) | 110 |
| Dibutyl Carbitol formal (TP-90B) | 18 |
| Epichlorohydrin | 6 |
| Butyl-Eight [1] | 2 |
| Sulfur | 1.75 |
| Zinc oxide | 3 |
| Aerosol OT [2] | 1 |
| Flexamine [2] | 3 |

[1] Dithiocarbamate-type rubber accelerator.
[2] As in Example I.

Three solid propellants were prepared using the binder composition described above. The compositions were as follows:

| | Parts by weight | | |
|---|---|---|---|
| | 1 | 2 | 3 (control) |
| Binder | 20 | 20 | 20 |
| Ammonium nitrate | 79.92 | 79.60 | 80 |
| 100 percent nitric acid [1] | 0.08 | 0.40 | |
| Milori blue [2] | 2 | 2 | 2 |

[1] White fuming nitric acid.
[2] A pigment similar to Prussian blue but having a red tint, prepared by the oxidation of a paste of potassium ferrocyanide and ferrous sulfate All mixing was performed in a Baker Perkins dispersion blade mixer. In the two runs in which nitric acid was present, the acid was mixed with the ammonium nitrate prior to incorporation of the oxidant with the binder. The grains were cured at atmospheric pressure for 48 hours at 170° F. in a circulating air oven. Results of various tests were as follows:

| | 1 | 2 | 3 |
|---|---|---|---|
| Firing temperature, °F | 70 | 70 | 70 |
| c*, ft./sec. (characteristic exhaust velocity) | 3,773 | 3,835 | 3,820 |
| Strand data: | | | |
| r at 1,000 p.s.i., in./sec.[1] | 0.155 | 0.164 | 0.149 |
| n [2] | 0.47 | 0.50 | 0.53 |
| Tensile data: | | | |
| Ultimate stress, p.s.i | 309 | 298 | 275 |
| Ultimate elongation, percent | 18 | 16.2 | 18.7 |
| Modulus of elasticity, p.s.i | 2,510 | 3,051 | 2,800 |
| Compression data: | | | |
| Ultimate stress, p.s.i | [3] >1,075 | 966 | 970 |
| Ultimate deformation, percent | [4] >14.6 | 31.5 | 28.5 |
| Modulus of elasticity, p.s.i | 8,670 | 6,240 | 5,400 |
| Beam flexure data: | | | |
| Ultimate load, lb | 44.4 | 45.7 | 34.2 |
| Ultimate deflection, inch | 0.299 | 0.208 | 0.24 |
| Modulus of rupture, p.s.i | 475 | 507 | 380 |
| Shore hardness, $A_2$: | | | |
| 0 sec | 96 | 95 | 95 |
| 10 sec | 90 | 85 | 93 |

[1] Burning rate.
[2] Pressure exponent in $r = aP_c^n$ where $a$ is a constant and $P_c$ is average chamber pressure.
[3] Value when specimen exceeds limit of machine.
[4] Value calculated at 1,000 p.s.i.

It will be noted that both inorganic and organic acids are used in these examples. Any acids can be used in the practice of this invention so long as they are sufficiently active to react with the nitrogen atom in the polymer to produce the pyridinium or quinolinium salt. Additional suitable inorganic acids include phosphoric acid, the halogen acids, such as hydrochloric and hydrobromic, and the like. Organic acids which react with this nitrogen atom include the saturated aliphatic acids such as formic, acetic, propionic, butyric, and the like. Furthermore the dicarboxylic aliphatic acids can be used as well as aromatic acids and unsaturated acids. The sulfonic acids are also suitable.

In each case, it is preferable that the acid be concentrated and the anhydrous acids are especially preferred. Where the acid is dilute, the reaction is slower and it is necessary to get rid of at least a portion of the water during the reaction. Where the acid is mixed with the polymer on a mill, this excess water can be removed by evaporation. In general, it may be said that the acid used should be at least a 50 percent concentration.

These examples are illustrative but, it will be understood, that many equivalents can be substituted for the specific materials set forth therein. Broadly, the polymers used correspond to those in the examples, these copolymers being prepared by polymerizing a conjugated diene and a copolymerizable heterocyclic nitrogen base. As those skilled in the art will understand the conjugated dienes which can be employed are, in addition to 1,3-butadiene, those which contain from four to eight, inclusive, carbon atoms per molecule and include isoprene (2-methyl-1,3-butadiene), piperylene, 2-methyl-1,3-pentadiene, 2,3-dimethyl-1,3-butadiene, chloroprene, and others. With a greater number of carbon atoms, the polymerization rate decreases somewhat, and there are so many isomers that it is not practical, with present procedures, to provide pure compounds. However, in a broader aspect of the invention, conjugated dienes having more than eight, such as twelve, carbon atoms per molecule can be used, particularly where the presence of various isomeric compounds can be tolerated. Furthermore, various alkoxy, such as methoxy and ethoxy, and cyano derivatives of these conjugated dienes, are also applicable. Thus, dienes, such as phenylbutadiene, 2,3-dimethyl-1,3-hexadiene, 2-methoxy-3-ethyl butadiene, 2-ethoxy-3-ethyl-1,3-hexadiene, 2-cyano-1,3-butadiene, and 2,3-diethyl-1,3-octadiene, are applicable.

The polymerizable heterocyclic nitrogen bases which are applicable for the production of the polymeric materials are those of the pyridine and quinoline series which are copolymerizable with a conjugated diene and contain one and only one

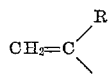

substituent wherein R is either hydrogen or a methyl group. That is, the substituent is either a vinyl or an alpha-methylvinyl (isopropenyl) group. Of these compounds, the pyridine derivatives are of the greatest interest commercially at present. Various substituted derivatives are also applicable but the total number of carbon atoms in the nuclear substituted groups, such as alkyl groups, should not be greater than 12 because the polymerization rate decreases somewhat with increasing size of the alkyl group. Compounds where the alkyl substituents are methyl and/or ethyl are available commercially.

These heterocyclic nitrogen bases have the formula

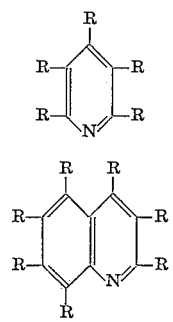

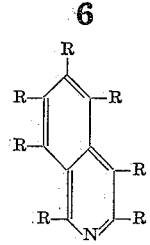

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 12. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl - 5 - vinylpyridine; 2 - methyl-5-undecyl-3-vinylpyridine; 2,4-dimethyl-5,6-dipentyl-3-vinylpyridine; 2-decyl-5(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano - 5 - (alpha-methylvinyl)pyridine; 3-vinyl-5-phenylpyridine; 2-(para-methylphenyl)-3-vinyl-4-methylpyridine; 3-vinyl - 5 - (hydroxyphenyl)pyridine; 2-vinylquinoline; 2-vinyl-4-ethylquinoline; 3-vinyl-6,7-di-n-propyl-quinoline; 2-methyl-4-nonyl-6 - vinylquinoline; 4(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

As indicated previously the copolymers can be prepared from mixtures of conjugated dienes and polymerizable heterocyclic nitrogen compounds or from mixtures of conjugated dienes, heterocyclic nitrogen compounds and certain other copolymerizable monomers. The latter monomers can include those containing an active

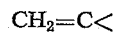

group such as aryl olefins, esters of acrylic and substituted acrylic acids, nitriles, amides, ketones, ethers, and halides. Specific examples of such copolymerizable monomers include styrene, various alkyl and substituted alkyl styrenes, 3-phenyl-3-butenel-1-ol, p-chlorostyrene, p-methoxystyrene, alpha-methyl-styrene, vinylnaphthalene, methyl acrylate, ethyl acrylate, methylmethacrylate, ethyl methacrylate, butyl methacrylate, methyl ethacrylate, acrylonitrile, methacrylonitrile, methacrylamide, methyl isopropenyl ketone, methyl vinyl ketone, methyl vinyl ether, vinyl acetate, vinyl chloride, vinylidene chloride, vinylfurane, vinylcarbazole, vinylacetylene, and the like.

The polymers preferred are those having a Mooney value (ML-4) of from about 5 to 30. If the Mooney value is less than 5, the final product has a strength and elongation too low for satisfactory use in propellants. Furthermore, the final product is too soft and sticky to process on a commercial scale. On the other hand, if the Mooney value is above 30, a propellant binder made from the material has high heat buildup, and an excess amount of plasticizer is required to produce an acceptable product. Furthermore, incorporation of the oxidant is difficult when the Mooney is above 30. The preferred range of carbon black is between 10 and 35 parts per 100 parts of the polymer. Where the carbon black content is above this upper limit, the propellant binder is too stiff to process satisfactorily and has an excessive extrusion pressure. With less than 10 parts of carbon black, the final product has poor dimensional stability, generates excessive smoke, and has a tendency to creep.

In a copending application of Hanmer and Carroll, Serial No. 470,371, filed November 22, 1954, now Patent No. 3,035,006, a method of preparing suitable polymeric binders is described, in which the polymerization is carried out in the presence of an alkali metal formaldehyde sulfoxylate dihydrate. This is the preferred method for the production of the polymers utilized in the present invention.

However, even the limits set forth therein, while being preferred, do not define the only methods of preparing the copolymers of the present invention.

In the preparation of the copolymers, the amount of monomeric heterocyclic nitrogen compound can vary between 1 and 50 parts per 100 parts of monomers. The conjugated diene component is present in an amount of at least 50 parts. The monomeric material containing the $CH_2=C<$ group copolymerizable with said diene can be used in an amount of up to 45 percent of the monomers.

The propellant compositions contain from 50 to 90 parts by weight of oxidizer and from 50 to 10 parts by weight of binder to make a total of 100 parts of material. In addition, from 0.25 to 12 parts by weight of a burning rate catalyst, based on 100 parts by weight of oxidant-binder mixture, is present. Oxidizers which are applicable include ammonium nitrate, potassium nitrate, ammonium perchlorate, and potassium perchlorate, used singly or in combination with each other. Burning rate catalysts are of two types. One type is a complex iron cyanide such as milori blue, Prussian blue, Turnbull's blue, Berlin blue, Chinese blue, and any other similar materials. The other type of burning rate catalyst which also gives very satisfactory results is ammonium dichromate.

The binder contains a rubbery copolymer of the type hereinbefore described and, in addition, there may be present one or more reinforcing agents, plasticizers, wetting agents, and antioxidants. Other ingredients which are employed include a vulcanization accelerator, a vulcanizing agent such as sulfur, and an accelerator activator such as zinc oxide.

A general formulation for a binder composition is given below:

| | Parts by weight |
|---|---|
| Rubbery copolymer (as hereinbefore described) | 100 |
| Reinforcing agent | 0–50 |
| Plasticizer | 0–100 |
| Wetting agent | 0–10 |
| Antioxidant | 0–3 |
| Vulcanization accelerator | 0.5–5 |
| Sulfur | 0.25–2 |
| Zinc oxide | 1–5 |

Reinforcing agents include carbon black, wood flour, lignin, and various reinforcing resins, such as styrene-divinylbenzene, methyl acrylate-divinylbenzene, acrylic acid-styrene-divinylbenzene, and methyl acrylate-acrylic acid-divinylbenzene resins.

In general, any rubber plasticizers may be employed in these binder compositions. Materials such as Pentaryl A (amylbiphenyl), Paraflux (saturated polymerized hydrocarbon), Circosol-2XH (petroleum hydrocarbon softener having a specific gravity of 0.940 and a Saybolt Universal viscosity at 100° F. of about 2000 seconds), and dioctyl phthalate are suitable plasticizers. Materials which have low freezing points in the rubber mixture are preferred. It is also frequently preferred that the plasticizers be oxygen-containing materials.

Since the acid salts of our invention possess surface activity, it is often possible to eliminate the use of additional wetting agents in the binder composition. However, as shown in the examples, it is frequently desirable to include a wetting agent. Suitable wetting agents include Aerosol OT (dioctyl ester of sodium salt of sulfosuccinic acid), lecithin, and Duomeen C diacetate (reaction product of acetic acid with the mono-salt formed from trimethylene diamine and coconut oil acid).

Antioxidants include Flexamine (physical mixture containing 25 percent of a complex diarylamine-ketone reaction product and 35 percent of N,N'-diphenyl-p-phenylenediamine), phenyl-beta-naphthylamine, 2,2'-methylene-bis (4-methyl-6-tert-butylphenol), and the like. Rubber antioxidants, in general, may be employed.

Examples of vulcanization accelerators are those of the carbamate type, such as N,N-dimethyl-8-tert-butylsulfenyl dithiocarbamate and Butyl-Eight.

It is to be understood that each of the various types of compounding ingredients may be used singly or mixtures of various ingredients performing a certain function may be employed. It is sometimes preferred, for example, to use mixtures of plasticizers rather than a single material.

When preparing the propellant compositions of this invention, the acid may be incorporated with the salt or oxidant and this mixture is then added to the remaining ingredients. In an alternative procedure, addition of the acid is made last, i.e., after the oxidant has been introduced, and mixing is continued until a homogeneous composition is obtained. In still another procedure, the acid is added simultaneously with the oxidant. Regardless of the method employed, the acid facilitates incorporation of the oxidant with the other ingredients giving a composition which is more uniform in appearance, indicating greater homogeneity of the mixture, than a similar composition in which an acid is not present.

Rocket grains are formed by compression molding, injection molding, or extrusion.

The curing temperature depends upon the oxidizer employed but will generally be in the range between 70 and 250° F. preferably betwene 140 and 180° F. When ammonium nitrate is used as the oxidizer, curing is effected below the phase II-phase III transition temperature which is 183° F. at atmospheric pressure.

The curing time must be long enough to give required creep resistance and other mechanical properties in the propellant. The time will generally range from around three hours when the higher curing temperatures are employed to seven days when curing is effected at lower temperatures.

As many possible embodiments may be made of this invention without departing from the scope thereof, it is to be understood that all matter herein set forth is to be interpreted as illustrative and not as unduly limiting the invention.

We claim:

1. A propellant composition consisting essentially of a major amount of an inorganic oxidizing salt and a minor amount of a salt formed by reacting an acid selected from the group consisting of phosphoric acid, nitric acid, sulfuric acid, hydrochloric acid, hydrobromic acid, formic acid, acetic acid, propionic acid and butyric acid with a polymer prepared by polymerizing 5 to 25 percent by weight of an alkyl substituted monovinylpyridine and 95 to 75 percent of a conjugated diene having 4 to 12 carbon atoms, said acid reacting with the polymer to form the corresponding pyridinium salt.

2. A propellant composition consisting essentially of a major amount of an inorganic oxidizing salt and a minor amount of a salt formed by reacting an acid selected from the group consisting of phosphoric acid, nitric acid, sulfuric acid, hydrochloric acid, hydrobromic acid, formic acid, acetic acid, propionic acid and butyric acid with a polymer prepared by polymerizing 5 to 25 percent by weight of 2-methyl-5-vinylpyridine and 95 to 75 percent of butadiene, said acid reacting with said polymer to form the corresponding pyridinium salt.

3. The propellant of claim 2 which the acid is used in an amount of from 0.5 to 5 parts by weight per 100 parts of said polymer.

4. A propellant composition consisting essentially of major amount of ammonium nitrate and a minor amount of a salt of nitric acid and a polymer of butadiene and 2-methyl-5-vinylpyridine.

5. The propellant of claim 4 in which the acid is used in an amount of from 0.5 to 5 parts by weight per 100 parts of said polymer.

6. A propellant composition consisting essentially of a major amount of ammonium nitrate and a minor amount of a salt of sulfuric acid and a polymer of butadiene and 2-methyl-5-vinylpyridine.

7. A propellant composition consisting essentially of a major amount of ammonium nitrate and a minor amount of a salt of acetic acid and a polymer of butadiene and 2-methyl-5-vinylpyridine.

8. A propellant composition consisting essentially of a major amount of a solid inorganic oxidizing salt and a minor amount of a salt of a polymer selected from the group consisting of copolymers of a conjugated diene containing 4 to 12 carbon atoms and a copolymerizable heterocyclic nitrogen base selected from the group consisting of vinyl and isopropenyl substituted pyridines and quinolines, and terpolymers of a conjugated diene containing 4 to 12 carbon atoms, a copolymerizable heterocyclic nitrogen base selected from the group consisting of vinyl and isopropenyl substituted pyridines and quinolines, and a monomer selected from the group consisting of styrene, 3-phenyl-3-butene-1-ol, p-chlorostyrene, p-methoxystyrene, alpha-methylstyrene, vinylnaphthalene, methyl acrylate, ethyl acrylate, methyl methacrylate, ethyl methacrylate, butyl methacrylate, methyl ethacrylate, acrylonitrile, methacrylonitrile, methacrylamide, methyl isopropenyl ketone, methyl vinyl ketone, methyl vinyl ether, vinyl acetate, vinyl chloride, vinylidene chloride, vinylfurane, vinylcarbazole, and an acid selected from the group consisting of phosphoric acid, nitric acid, sulfuric acid, hydrochloric acid, hydrobromic acid, formic acid, acetic acid, propionic acid and butyric acid.

9. The propellant of claim 8 wherein the polymer is a terpolymer of butadiene, styrene, and 2-methyl-5-vinylpyridine.

10. The propellant of claim 8 in which the polymer is a terpolymer of styrene, butadiene, and 5-ethyl-2-vinylpyridine.

11. The polymer of claim 8 wherein the polymer is a terpolymer of butadiene, styrene and 2-vinylpyridine.

12. The propellant of claim 8 wherein the acid is used in an amount of from 0.5 to 5 parts by weight per 100 parts of said polymer.

References Cited in the file of this patent

UNITED STATES PATENTS 2,481,811   Barton ---------------- Sept. 13, 1949